US009116355B2

(12) United States Patent
Teetzel et al.

(10) Patent No.: US 9,116,355 B2
(45) Date of Patent: Aug. 25, 2015

(54) MONOCULAR/BINOCULAR BRIDGE FOR VIEWING DEVICE AND HELMET MOUNT EMPLOYING SAME

(71) Applicant: Wilcox Industries Corp., Newington, NH (US)

(72) Inventors: James W. Teetzel, York, ME (US); Justin D. Harris, Haverhill, MA (US); Travis S. Mitchell, Dover, NH (US)

(73) Assignee: Wilcox Industries Corp., Newington, NH (US)

( * ) Notice: Subject to any disclaimer, the term of this patent is extended or adjusted under 35 U.S.C. 154(b) by 216 days.

(21) Appl. No.: 13/630,695

(22) Filed: Sep. 28, 2012

(65) Prior Publication Data

US 2013/0083391 A1 Apr. 4, 2013

Related U.S. Application Data

(60) Provisional application No. 61/541,874, filed on Sep. 30, 2011.

(51) Int. Cl.
 *G02B 23/18* (2006.01)
 *A42B 3/00* (2006.01)
 *A42B 3/04* (2006.01)

(52) U.S. Cl.
 CPC .................................... *G02B 23/18* (2013.01)

(58) Field of Classification Search
 CPC ........ A42B 3/04; A42B 3/042; G02B 23/125; G02B 27/0149; G02B 23/18; G02B 7/002
 USPC ................. 359/409, 817; 2/6.2, 422
 See application file for complete search history.

(56) References Cited

U.S. PATENT DOCUMENTS

| | | | | |
|---|---|---|---|---|
| 5,471,678 A * | 12/1995 | Dor | | 2/6.7 |
| 6,462,867 B2 * | 10/2002 | Choinere | | 359/409 |
| 6,462,894 B1 * | 10/2002 | Moody | | 359/815 |
| 6,493,137 B1 * | 12/2002 | Solinsky et al. | | 359/409 |
| 7,219,370 B1 * | 5/2007 | Teetzel et al. | | 2/6.2 |
| 8,209,780 B1 * | 7/2012 | Lemire | | 2/422 |
| 8,375,473 B2 * | 2/2013 | Celona et al. | | 2/422 |
| 8,739,313 B2 * | 6/2014 | Teetzel et al. | | 2/6.6 |
| 2004/0181856 A1 * | 9/2004 | Oleson | | 2/424 |
| 2007/0214551 A1 * | 9/2007 | Teetzel et al. | | 2/422 |
| 2008/0170838 A1 * | 7/2008 | Teetzel et al. | | 386/118 |
| 2011/0145981 A1 * | 6/2011 | Teetzel et al. | | 2/422 |
| 2011/0239354 A1 * | 10/2011 | Celona et al. | | 2/422 |

FOREIGN PATENT DOCUMENTS

AU 349602 7/2013

OTHER PUBLICATIONS

Teetzel et al., U.S. Appl. No. 61/819,199, filed May 3, 2013.
Teetzel et al., U.S. Appl. No. 13/930,534, filed Jun. 28, 2013.

* cited by examiner

*Primary Examiner* — Frank Font
(74) *Attorney, Agent, or Firm* — McLane, Graf, Raulerson & Middleton, Professional Association

(57) ABSTRACT

An improved monocular/binocular bridge and helmet mounting device employing same for an optical device are provided. The mounting device herein includes a mount with a bridge attachment for providing multiple options for a monocular or binocular optical device and multiple options for moving the attached optical device to any of multiple stowed positions out of the user's line of sight when the optical device is not in use. The bridge attachment and multiple stow positions also allow the unit to be adapted for a variety of viewing devices.

18 Claims, 14 Drawing Sheets

MONOCULAR/BINOCULAR BRIDGE FOR VIEWING DEVICE AND HELMET MOUNT EMPLOYING SAME

INCORPORATION BY REFERENCE

The following U.S. patents and patent applications are incorporated herein by reference in their entireties:

U.S. Patents

| U.S. Pat. No. | Issue Date |
| --- | --- |
| 7,219,370 | May 22, 2007 |

U.S. Published Applications

| U.S. Publication No. | Publication Date |
| --- | --- |
| 2011/0145981 | Jun. 23, 2011 |
| 2007/0214551 | Sep. 20, 2007 |
| 2010/0299814 | Dec. 2, 2010 |

U.S. Nonprovisional Applications

| Application No. | Filing Date |
| --- | --- |
| 12/117,704 | May 8, 2008 |
| 12/259,010 | Oct. 27, 2010 |
| 12/759,435 | Oct. 27, 2010 |
| 13/019,889 | Feb. 2, 2011 |

U.S. Provisional Applications

| Application No. | Filing Date |
| --- | --- |
| 61/351,084 | Jun. 3, 2010 |
| 61/300,770 | Feb. 2, 2010 |
| 61/263,159 | Nov. 20, 2009 |

BACKGROUND

The present disclosure relates to an improved system for mounting an optical device to headgear such as a field helmet, and specifically, a mount and a bridge attachment for same providing multiple options for a monocular or binocular optical device and multiple flip options for moving an attached optical device between a viewing position when the device is in use and a flipped or stowed position out of the user's line of sight when the optical device is not in use. The optical device may be, without limitation, a monocular, binoculars, a night vision device enabling viewing under nighttime or other low light conditions, such as night vision goggles (NVG) (monocular or binocular) or enhanced night vision goggles (ENVG) (monocular or binocular), thermal imaging and short wave infra-red (SWIR) devices, and so forth.

SUMMARY

In one aspect, a bridge mount assembly for mounting an optical device to a helmet includes a mounting shoe member and a bridge mounting member. The mounting shoe member comprises a mounting shoe that mates with a mounting shoe receiver attached to the helmet. The bridge mounting member attaches the optical device to the bridge mount assembly, and the bridge mounting member comprises a pivot arm that allows rotation of the optical device around a pivot axis.

In another aspect, an optical bridge-helmet mount assembly comprises the bridge mount assembly and further comprises a helmet mount assembly that connects the bridge mount assembly to a helmet.

In still another aspect, a system comprises the bridge mount assembly, the helmet mount assembly, and further comprises an optical device.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
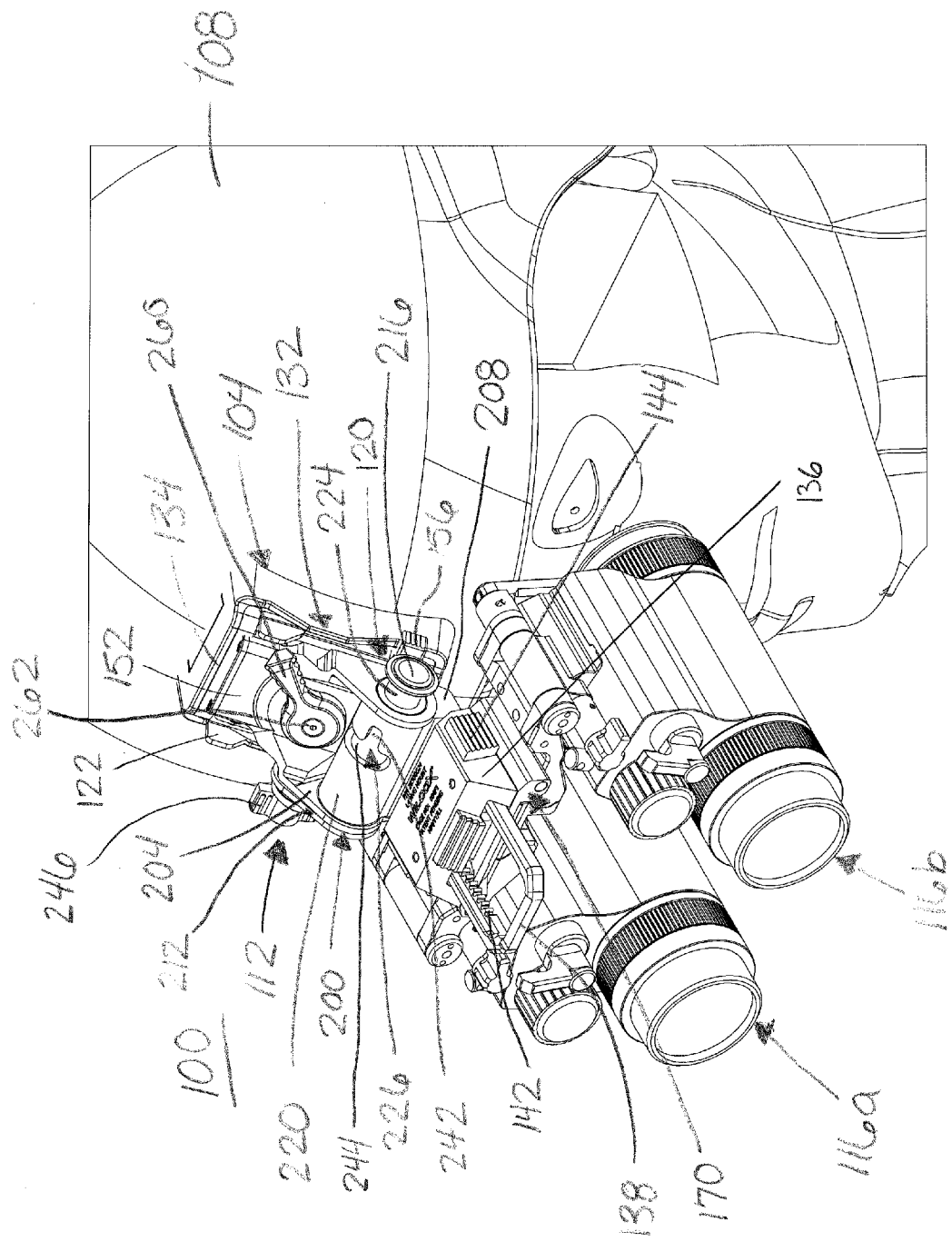
FIG. 1 is an isometric view taken generally from the front and side of an associated helmet carrying an associated optical device using a helmet mount system according to an exemplary embodiment, wherein the optical device is positioned in front of the eyes of the user.
Figure 2:
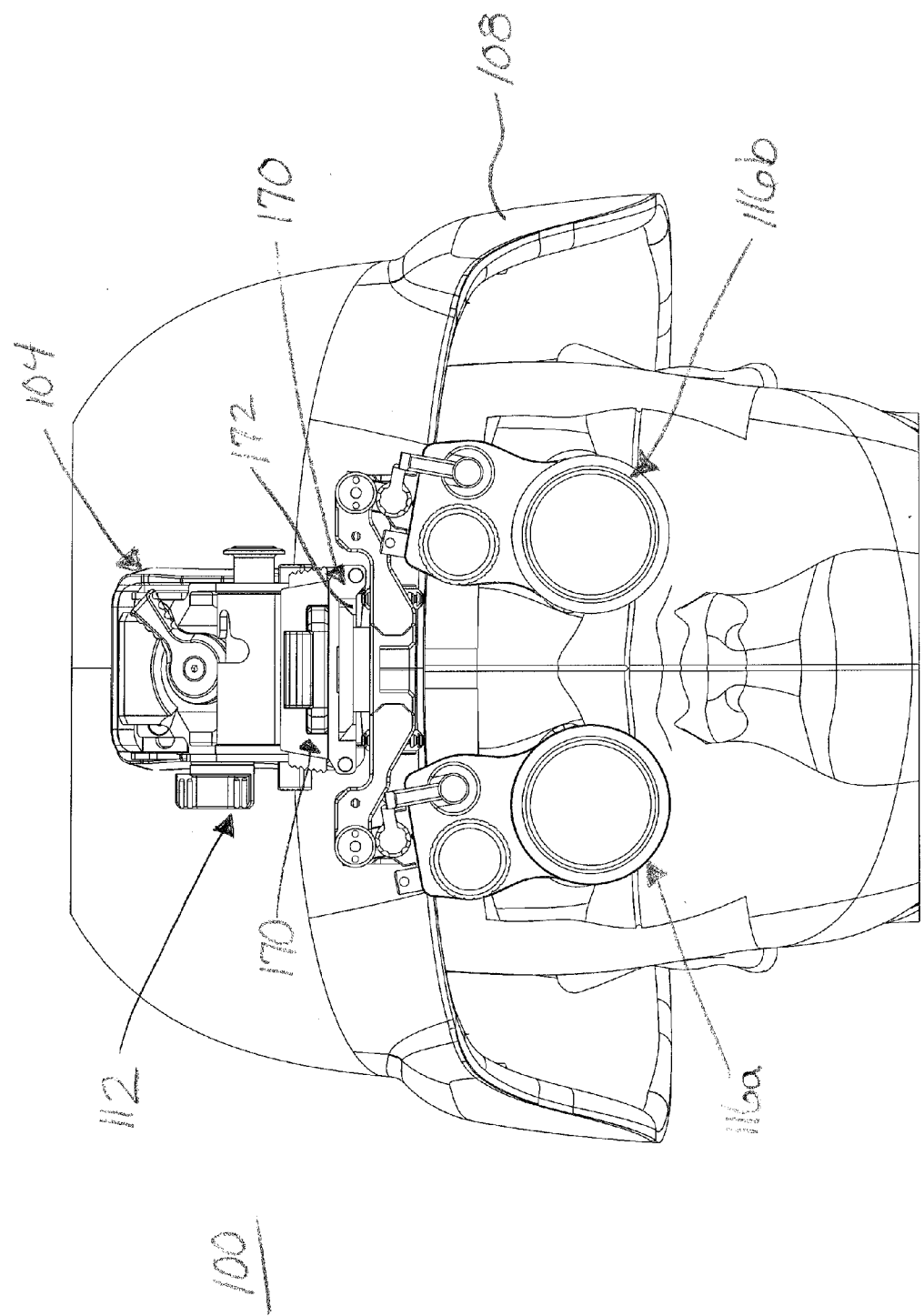
FIG. 2 is a front view of the embodiment appearing in FIG. 1, wherein the optical device is positioned in front of the eyes of the user.
Figure 3:
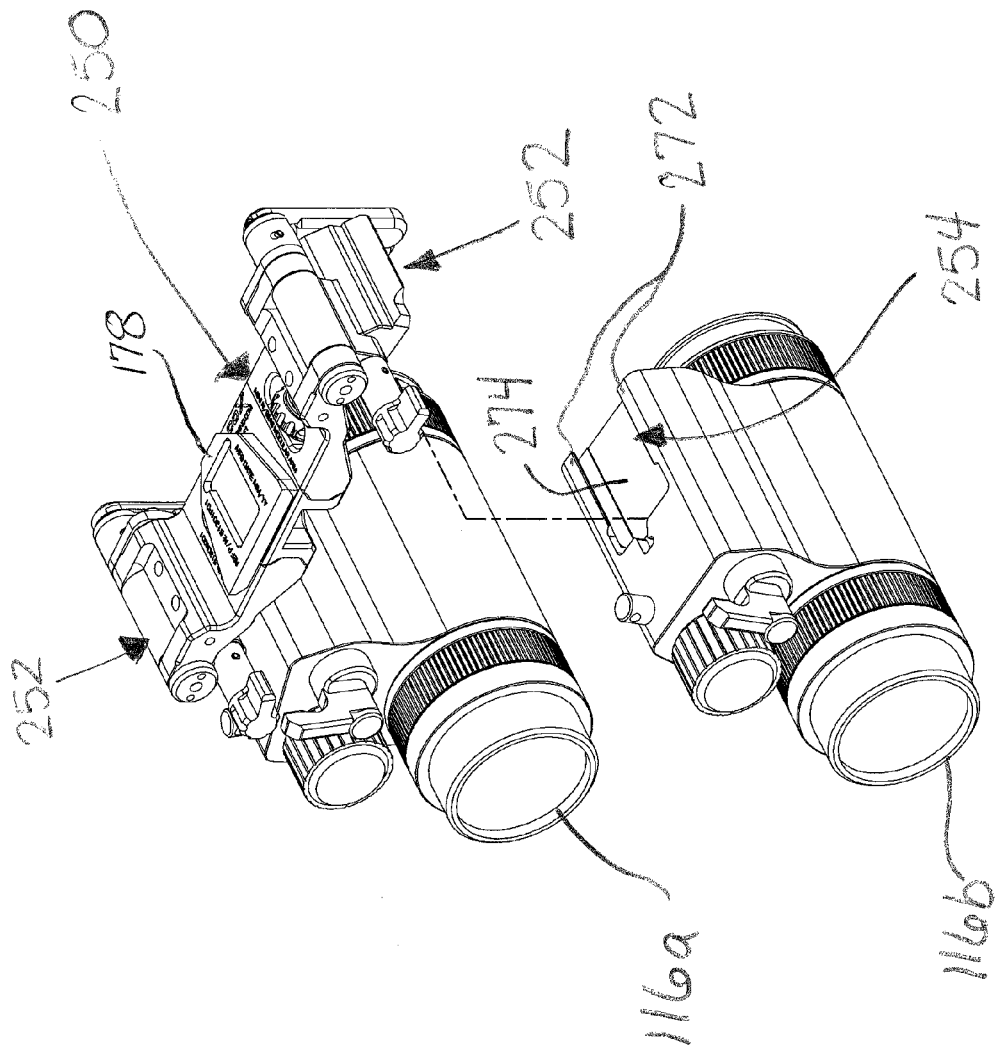
FIG. 3 is a partially exploded isometric view of the bridge mount and optical device of the helmet mount system embodiment appearing in FIG. 1.
Figure 4:
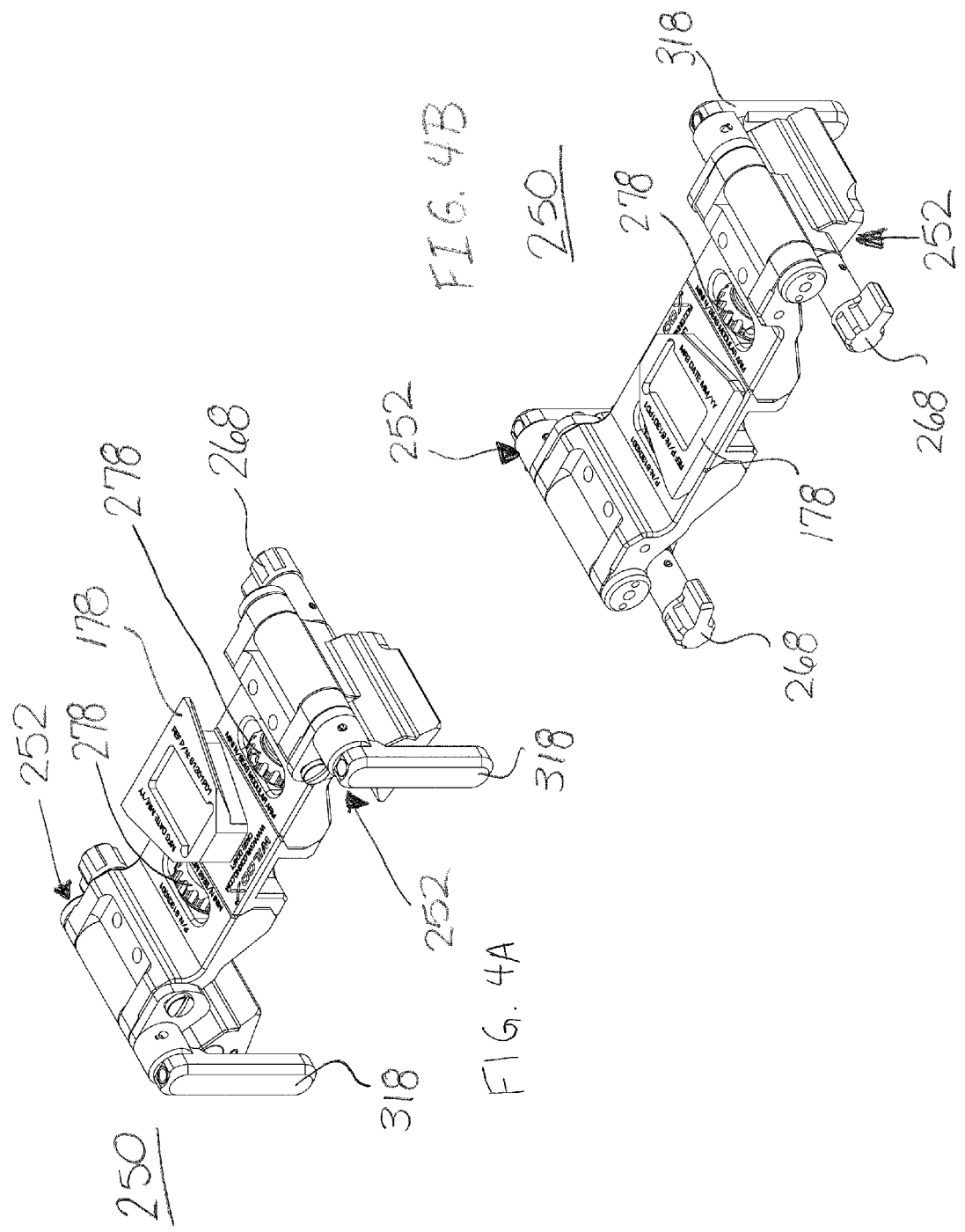
FIG. 4A is an isometric view of the bridge mount of the embodiment appearing in FIG. 1, taken generally from the rear and side.
FIG. 4B is an isometric view of the bridge mount of the embodiment appearing in FIG. 1, taken generally from the front and side.
Figure 5:
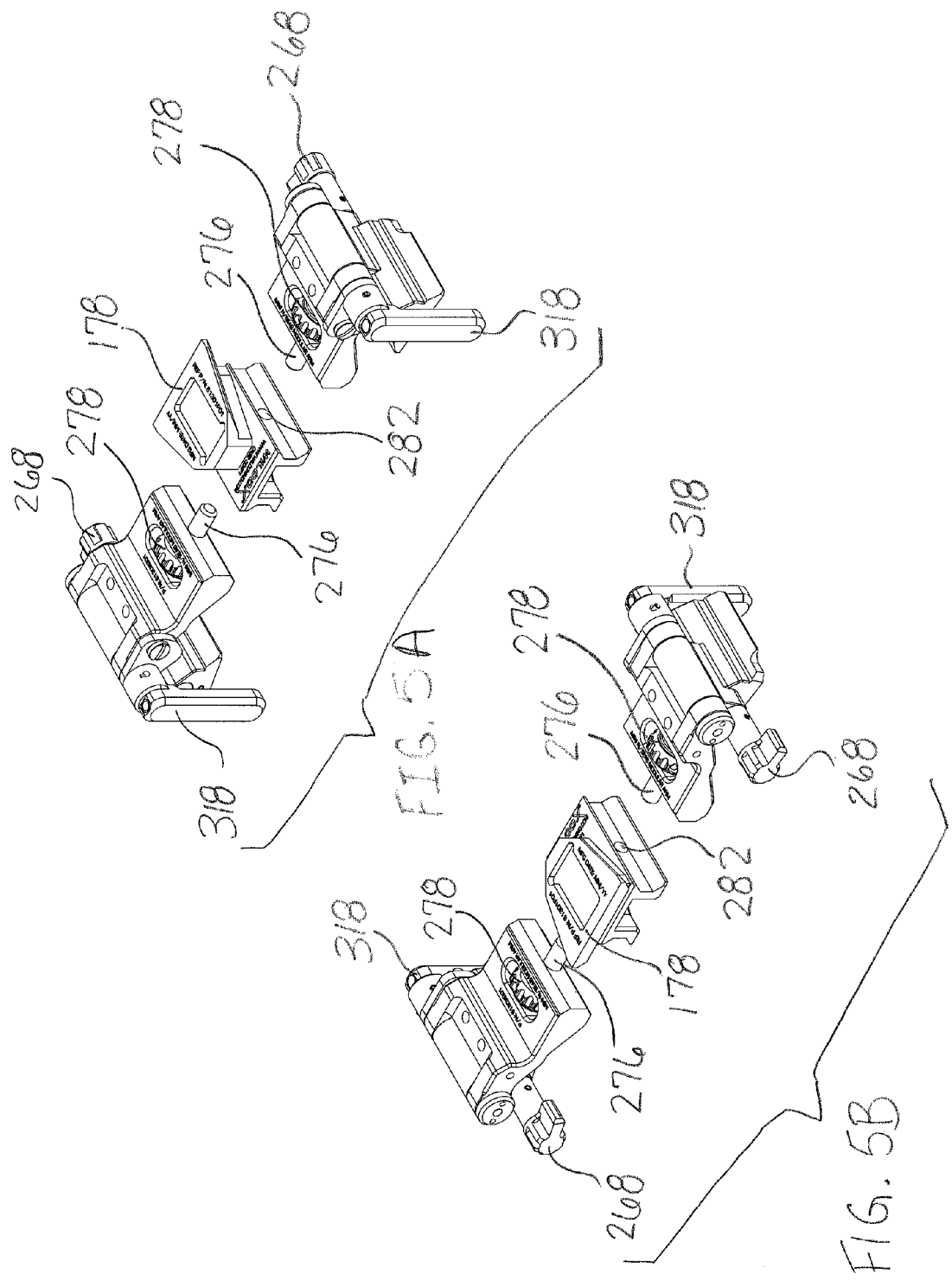
FIG. 5A is a partially exploded isometric view of the bridge mount appearing in FIG. 4A.
FIG. 5B is a partially exploded isometric view of the bridge mount appearing in FIG. 4B.
Figure 6:
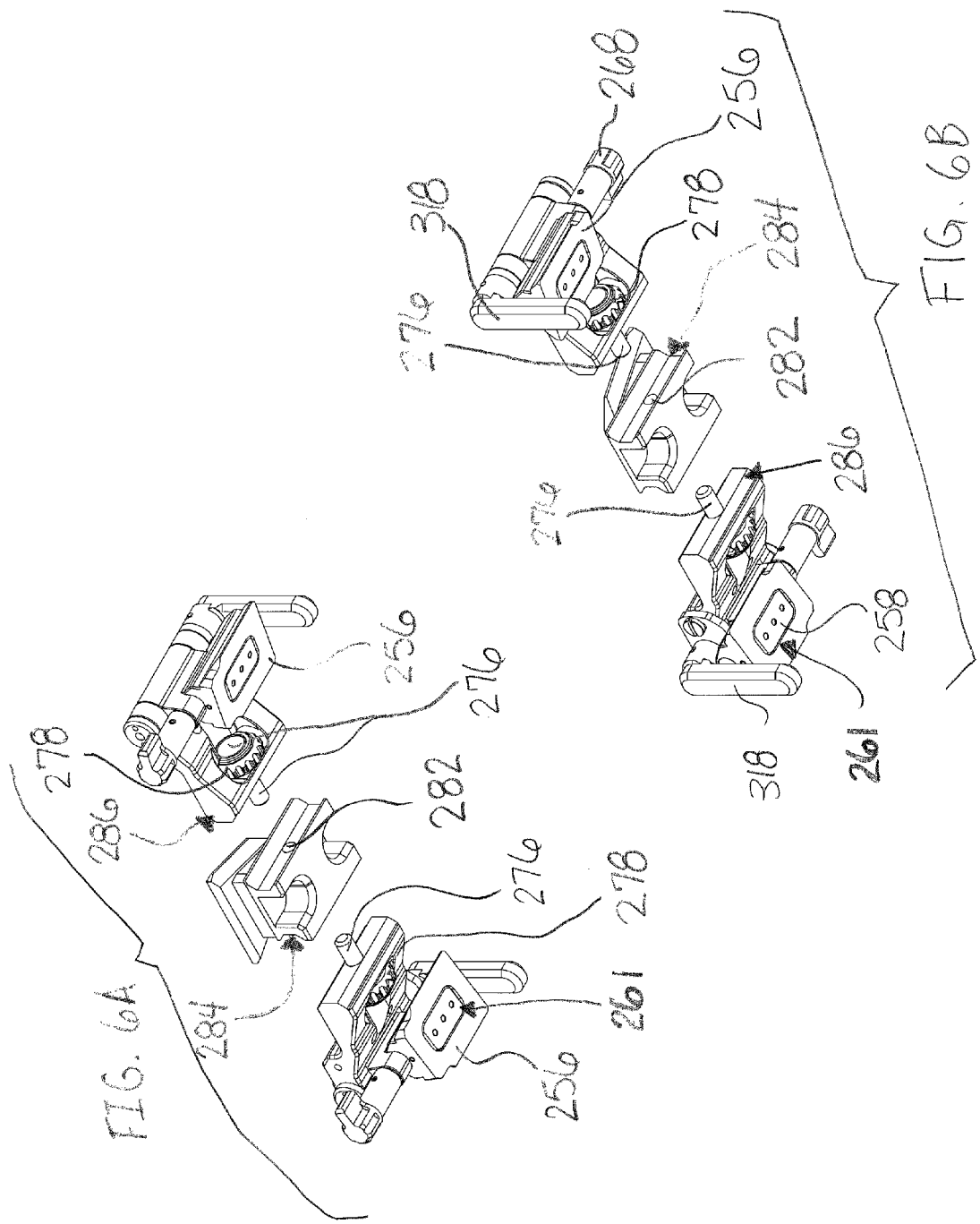
FIG. 6A is a partially exploded isometric view of the bridge mount appearing in FIG. 4A, taken generally from the rear and bottom of the bridge mount.
FIG. 6B is a partially exploded isometric view of the bridge mount appearing in FIG. 4B, taken generally from the front and bottom of the bridge mount.

Referring now to the drawing FIGS. 1-12, wherein like reference numerals refer to like or analogous components throughout the several views, there appears an exemplary helmet mounting system embodiment 100, of the present invention. The helmet mounting system 100 may be as described in the commonly owned U.S. provisional application No. 61/263,159 filed Nov. 20, 2009 and incorporated herein by reference. As best seen in FIGS. 1 and 2, the helmet mounting system 100 includes a connection plate assembly 104 attached to the front portion of helmet 108. A pivoting helmet mount assembly 112 is removably attached at a first end to the connection plate 104 and includes a second end adapted to be removably attached to a viewing or sighting device 116, such as an optical device, monocular or binocular night vision goggle or ENVG devices, monoculars, binoculars, thermal or infra-red, SWIR (short wave infra-red) imaging devices, helmet mounted display screen, head-up display or any other helmet mounted optical, electro-optical or other viewing or targeting device. In the depicted embodiments of FIGS. 1 and 2, two monocular optical devices 116a and 116b providing a binocular vision system are shown. The optical devices 116a and 116b may each advantageously be a low profile night vision device such as the Mini N/SEAS low-profile night vision goggle (LPNVG) manufactured by ITL Optronics Ltd. of Israel. It will be recognized, however, that the present invention may be adapted for use with all manner of night vision or other optical devices. By providing modular bridge mounting members, the present mounting system may readily be tailored for use with other viewing devices, including those with widely varying profiles or dimensions.

The monocular/binocular bridge is shown and described herein with a preferred pivoting helmet mount 112. It will be recognized that the monocular/binocular bridge can be adapted for use with other helmet mounts including without limitation alternative helmet mounts available from Wilcox Industries Corp. of Newington, N.H. Additional details concerning the construction of the helmet mount can be found in the commonly owned patents, publications, and applications incorporated herein by reference above. The preferred pivoting helmet mount 112 illustrated herein includes a helmet interface assembly 120 that interfaces with the mounting plates 104. The mounting plate 104 contain guide rails 132, a lower groove lip (not shown), and an upper groove lip 134. The mounting assembly 120 includes a base member (not shown) and has a vertical adjust plate assembly (not shown) secured thereto, e.g., via fasteners (not shown). The base member includes a locking tongue (not shown) and side walls (not shown). The side walls mate with the guide rails formed on plate 104. A locking tongue (not shown) engages the lower groove lip of mounting plate 104 and a tension member (not shown) such as a spring may be provided to prevent movement or rattling between mounting assembly 120 and plate 104.

The helmet mount assembly 112 includes a sliding plate 152 which slides vertically with respect to the vertical adjust plate (not shown). The sliding plate 152 is slidably received over locking rails (not shown) disposed on the vertical adjust plate. A cover plate (not shown) may be secured to the open end of the sliding plate 152 to prevent debris from entering the space between the sliding plate 152 and the vertical adjustment plate, which may interfere with the sliding movement of the sliding plate 152 and vertical adjustment plate of the helmet mount assembly 112. The sliding plate 152 is selectively positionable relative to the vertical adjustment plate to provide a vertical adjustment of the optical device relative to the eyes of the wearer and is described in greater detail below.

The helmet interface assembly 120 may also include a breakaway actuator 122 enabling the pivoting helmet mount 112 to separate from the helmet interface assembly 120 when sufficient force is applied. The breakaway setting is advantageous in that it may prevent injury to the wearer in the event of entanglement or impact of the optical device. The helmet interface assembly 120 can be secured to the connection plate assembly 104 by squeezing the actuator bar 156, pressing the mounting assembly 120 into place on the plate assembly 104 and releasing the actuator bar 156 allowing the locking tongue (not shown) to move into its engaged position and engage the lower groove lip (not shown). In addition, the locking tongue member (not shown) has a tooth (not shown) for engaging a groove (not shown) on the breakaway actuator 122. When the tooth engages the groove, breakaway actuator 122 is secured to the helmet interface assembly 120. If sufficient force is applied, the breakaway actuator 122 will release from the assembly 120 to prevent injury to the wearer.

The pivoting helmet mount 112 also includes a vertical adjustment assembly 200 having a first pivot arm 204, a second pivot arm 208, and a pivot pin assembly 216. The second pivot arm 208 is pivotally attached to the first pivot arm 204. The second pivot arm 208 includes an outer, generally cylindrical sleeve 220 which rotates with respect to a pivot pin assembly 216. The pivot pin assembly 216 includes a central rod (not shown) coaxial with the pivot axis and carrying a protruding pin (not shown) received within opening (not shown). A generally cylindrical sleeve or bushing (not shown) is coaxially disposed intermediate the sleeve 220 and the axial rod 224. The bushing (not shown) includes an elongated slot (not shown) through which the pin (not shown) extends. The central rod 224 is movable in the axial direction against the urging of a captured coaxial spring (not shown) whereby the pin (not shown) may travel within the slot (not shown).

Figure 11:
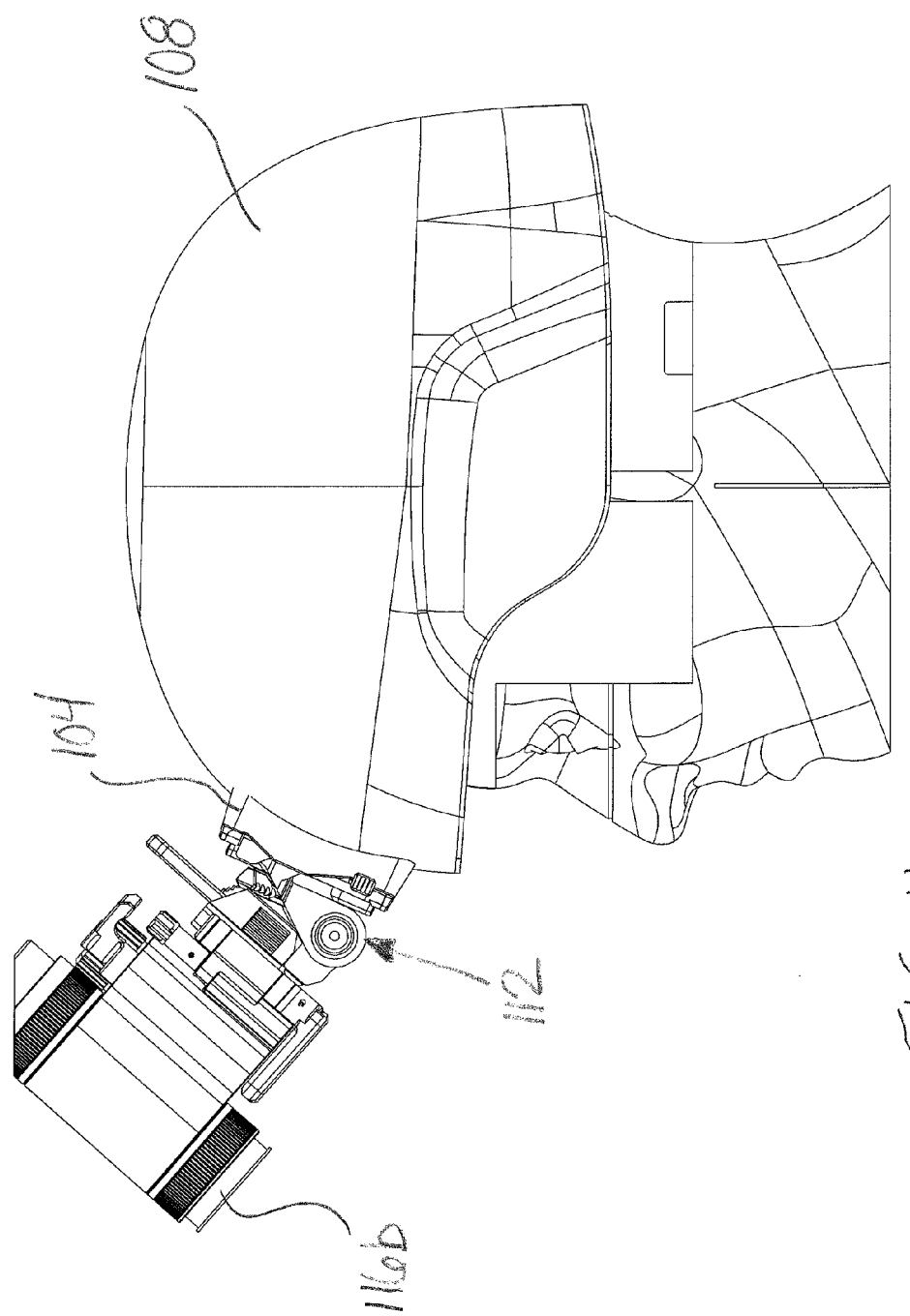
FIG. 11 is a side view of the helmet mount system of FIGS. 1 and 2 in a second stowed position, wherein the optical devices are pivoted about a mount pivot axis to a second stowed position.

The outer sleeve 220 further includes a slot 236 into which the pin (not shown) extends. The slot 236 includes a rear axially extending leg (not shown), a front axially extending leg 242, and a base 244 extending in the radial direction between the rear leg and front leg 242. The pin (not shown) engages the rear leg portion (not shown) of the slot 236 when the optical devices 116a and 116b are in the operational position. Manually depressing the central rod 224 and allowing the arm 208 to pivot with respect to the arm 204. Upon pivoting the unit and releasing the rod 224, the pin (not shown) travels to the front leg 242 whereby the optical devices 116a and 116b are retained in a flipped-up position, as best seen in FIG. 11. In a preferred embodiment, the elongated slot (not shown) and the rear leg and front leg 242 are tapered such that they widen toward the base 244 to provide a wedging action on the pin (not shown) and to provide ease of operation during the pivoting operation.

An angle or tilt adjustment knob 246 includes a threaded rod (not shown) rotatably engaging a mating threaded opening (not shown) in the pivot arm 204. The arm 204 rotates relative to plate 212, which includes an oblong, elongate or curvate opening or slot (not shown) receiving the threaded rod (not shown). Loosening the knob 246 allows adjustment of the optics to a desired tilt angle according to the user's eye position and a desired line of sight, whereby the tilt angle may then be secured in the desired position by tightening the knob 246.

A vertical moving lever 260 includes a threaded screw 262 which travels through opening (not shown) and engages a cam lock (not shown). The cam lock interfaces with the vertical adjustment plate (not shown) of a helmet interface assembly 120. When the lever 260 is turned to the locked position, the cam lock interacts with the locking rails (not shown) of the vertical adjustment plate securing the vertical adjustment assembly 200 in the desired position. If the lever 260 is moved to the released position, the cam lock disengages from the locking rails enabling the wearer to vertically move the vertical adjustment assembly 200 to the desired vertical position. Movement of the vertical adjustment assembly 200 enables adjustment of the vertical position of an optical device relative to the wear's eye position and desired line of sight. Once a desired vertical position is located, the lever 260 is moved back to a locked position and the cam lock engages with locking rails preventing vertical movement of the assembly 200.

The second pivot arm 208 attaches to a slide rail 138 extending in the horizontal position (when the helmet is worn by a user and the optical device is in the operation, i.e., flipped down position). A sliding carriage 136 is movable along the slide rail 138 to allow the user to horizontally position the optical device at a comfortable or desired focal distance from the operator's eyes. At least one side of the slide rail 138 contains a series of locking teeth 142 along its length for engaging an internal locking member such as a toothed member, pin, or the like, to provide secure retention at a selected position. Release buttons 144, biased toward the locked position, may be manually depressed to disengage the locking members to allow sliding movement of the carriage 136 until the optics are positioned at a desired focal position in front of the user's eye(s). Threaded fasteners (not shown) secure the slide rails 138 to the second pivot arm 208. The sliding carriage assembly 136 also includes a mounting shoe receiver assembly 170, which includes a mounting shoe receiver 172, for securing the optical devices 116a and 116b to the helmet 108. The mounting shoe receiver 172 includes a dovetail or like receptacle 176 for removably receiving a complimentary mating mounting shoe member 178.

Figure 7:
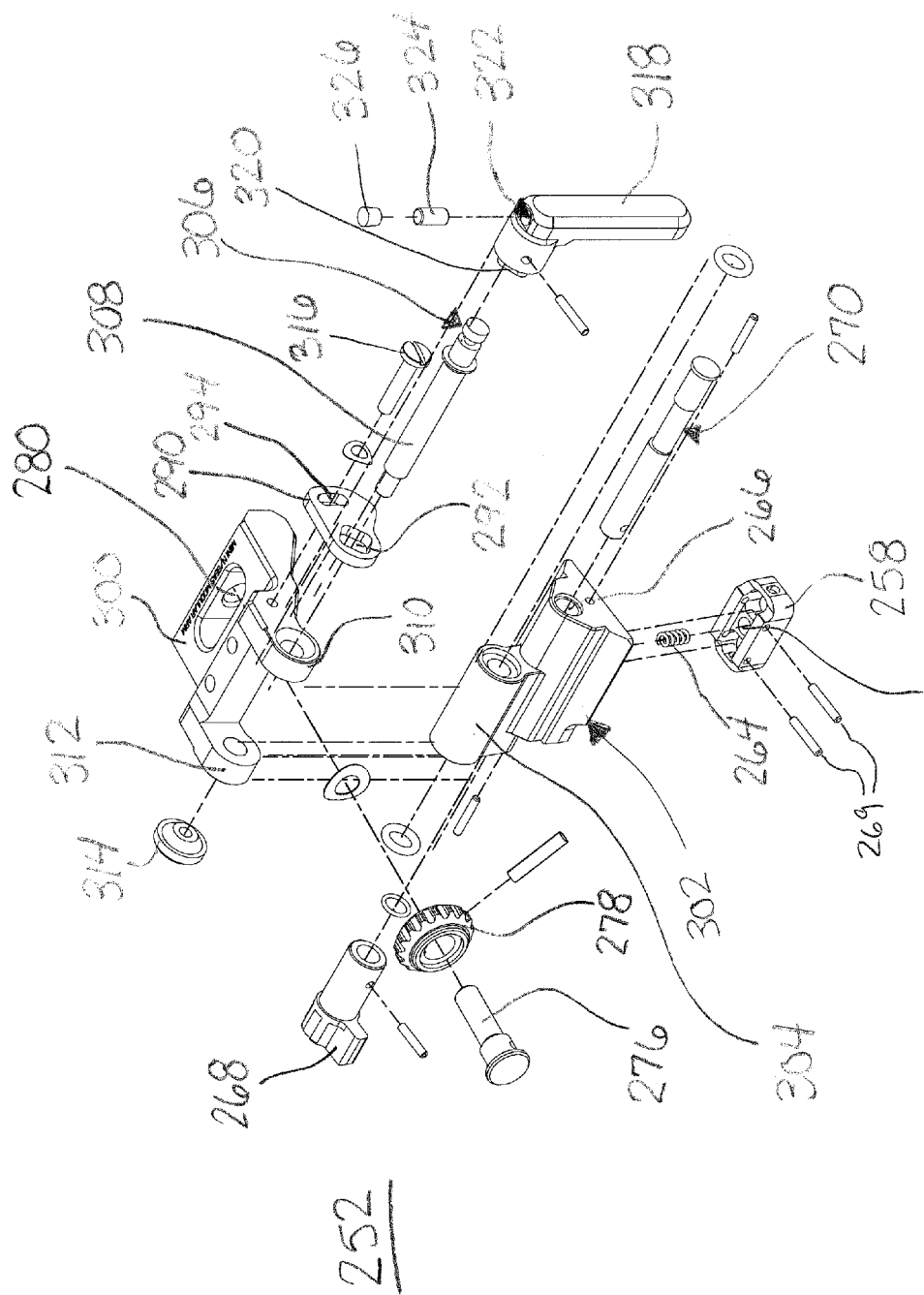
FIG. 7 is an exploded isometric view of a bridge mounting member of the helmet mounting assembly appearing in FIGS. 1-6B.
Figure 8:
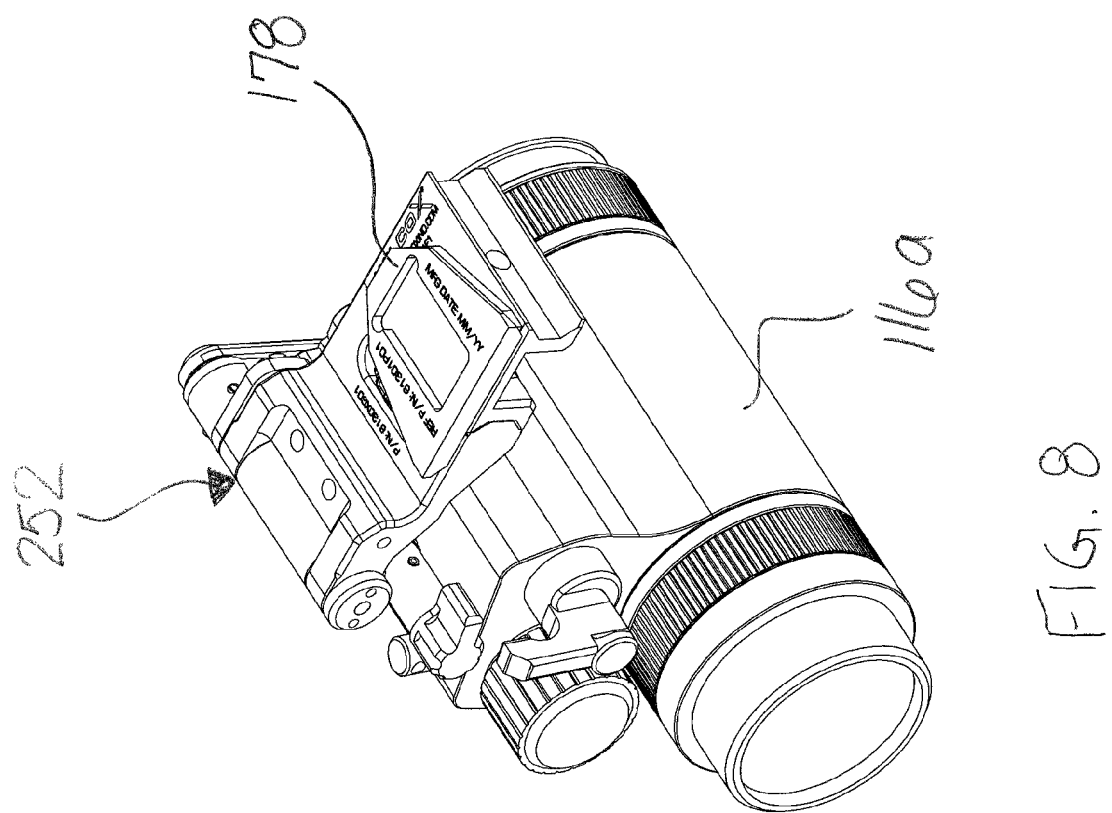
FIG. 8 is an isometric view illustrating the bridge mount for a right eye monocular device taken generally from the front and side of the optical device.
Figure 9:
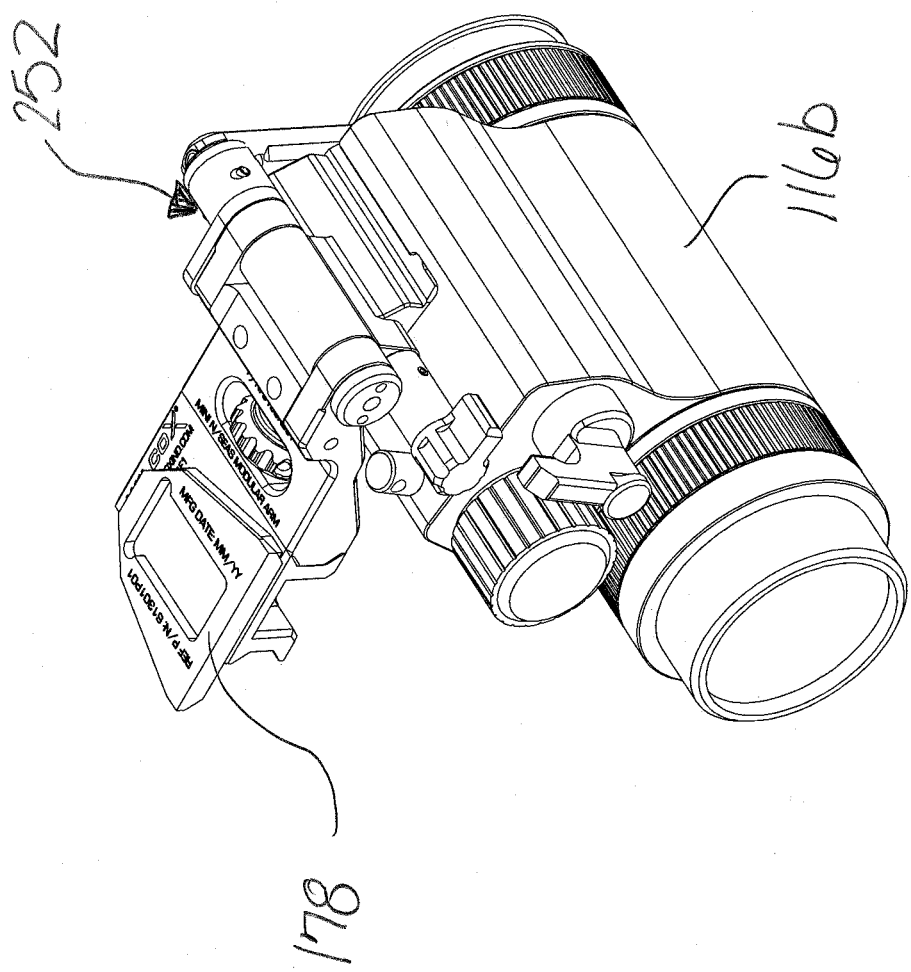
FIG. 9 is an isometric view illustrating the bridge mount for a left eye monocular device taken generally from the front and side of the optical device.

The optical devices 116a and 116b are secured to the sliding carriage assembly 136 of the pivoting helmet mount assembly 112 via the mounting shoe member 178 of a bridge mount assembly 250. As best seen in FIGS. 3-9, the bridge mount assembly 250 includes a mounting shoe member 178 and at least one bridge mounting member 252 (with two being shown in the embodiments shown in FIGS. 1-6B and 10-12 and one being shown in the embodiments shown in FIGS. 8 and 9). As best seen in FIG. 7 with continued reference to FIGS. 1-6B, the bridge mounting member 252 includes a first pivot arm 300 pivotally attached to a second pivot arm 302. The second pivot arm 302 includes an outer, generally cylindrical sleeve 304 which rotates with respect to a pivot pin assembly 306. The pivot pin assembly 306 includes a central rod 308 coaxial with the pivot axis to enable the optical devices 116a and 116b to be rotated about the first pivot arm 300 into a stowed position. The second pivot arm 302 fits between the first and second attachment arms 310 and 312, respectively, of the first pivot arm 300 and the central rod 308 passes through the first attachment arm 310, the cylindrical sleeve 304, and the second attachment arm 312 where it is secured with a cap 314.

The optical device 116a is secured to the bridge mounting member 252 via a mounting shoe receiver 254. The mounting shoe 256 of the bridge mounting member 252 slides into the mounting shoe receiver 254 and the tapered edge of the mounting shoe 256 mates with the rails 272 of the mounting shoe receiver 254. The mounting shoe 256 has a pressure foot 258 which mounts into an opening 260 in the bottom of the mounting foot 256. The pressure foot 258 has a cavity 262 for receiving a spring 264 which mates with a passage 266. The spring 264 holds tension before the cam 270 is engaged. A pressure foot cam knob 268 fits into a first end of the passage 266 and is pivotally attached to a cam 270 which fits into a second end of the passage 266. When the knob 268 is turned to the locked position, the cam 270 rotates and exerts a force on two pins 269 received within openings in the pressure foot 258 thereby pushing the pressure foot 258 toward the base surface 274 of the mounting shoe receiver 254 and securing the optical device 116a onto the bridge mounting member 252. To release the optical device 116a from the bridge mounting member 252 the user would turn the knob 268 to the release position thereby releasing the force exerted on the pins 269 which in turns releases the pressure foot 258 and enables the user to slide the optical device 116a off the mounting shoe 256 of the bridge mounting member 252. The optical device 116b is secured to the bridge mounting member 252 in the same manner as described above with reference to the optical device 116a.

One or two bridge mounting members 252 are removably attached to the mounting shoe member 178 via a threaded fastener 276. The threaded fastener 276 is inserted through the attachment knob 278 which enables a user to tighten the fastener 276 with his/her finger to attach the bridge mounting members 252 to the mounting shoe member 178. Once the threaded fastener 276 passes through the attachment knob 278 it is inserted into opening 280 in the first pivot arm 300. The threaded fastener 276 is then inserted into threaded cavity 282 thereby securing the bridge mounting member 252 to the mounting shoe member 178. The mounting shoe member 178 has an angled channel 284 that mates with the corresponding angled protrusion 286 on the bridge mounting member 252 when secured together via the threaded fastener 276 to prevent the mount from wobbling when in use.

The bridge mounting member 252 also has a rotational set stop 290 which enables the user to set the interpupillary distance for binocular optical devices or the pupillary distance for monocular optical devices. The rotational set stop 290 has a first rectangular opening 292 and a second oblong opening 294. The rotational set stop 290 is secured to the first pivot arm 300 via a threaded fastener 316. The user may loosen the threaded fastener 316 enabling the first pivot arm 300 to slide up and down within the opening 294 allowing the user to tilt the position of the optical devices 116a and 116b to adjust the interpupillary distance for binocular and pupillary distance for monocular optical devices. Once a desired distance is found, the user tightens the threaded fastener 316 to secure the desired position of the optical devices. The rotational set stop 290 also enables the user to return the optical device to the desired position when the optical device is moved from the stowed to operational position.

The bridge mounting member 252 includes a magnetic arm 318 for automatically turning off the optical device 116 when it is placed into a stowed position. The magnetic arm 318 has a rectangular protrusion 320 which mates with the opening 292, a cavity 322, a magnet 324, and a plug 326. The protrusion 320 and mating opening 292 tie the magnet arm 318 to the rotational set stop 290 to allow for the magnetic arm 318 to maintain the desired position in relation to the NVG or other device when the user adjusts the pupillary or interpupillary distance of the optical device in the operational position. The magnet 324 fits inside a cavity 322 and is secured in the magnetic arm 318 using the plug 326. In the operational position, the magnet 324 is in an engaged position enabling the optical device 116 to be powered on. When the user flips the optical device 116 into a stowed position the magnet 324 disengages, e.g., by moving the magnet out of proximity of an associated sensor on the viewing device, and the optical device 116 turns off.

Figure 10:
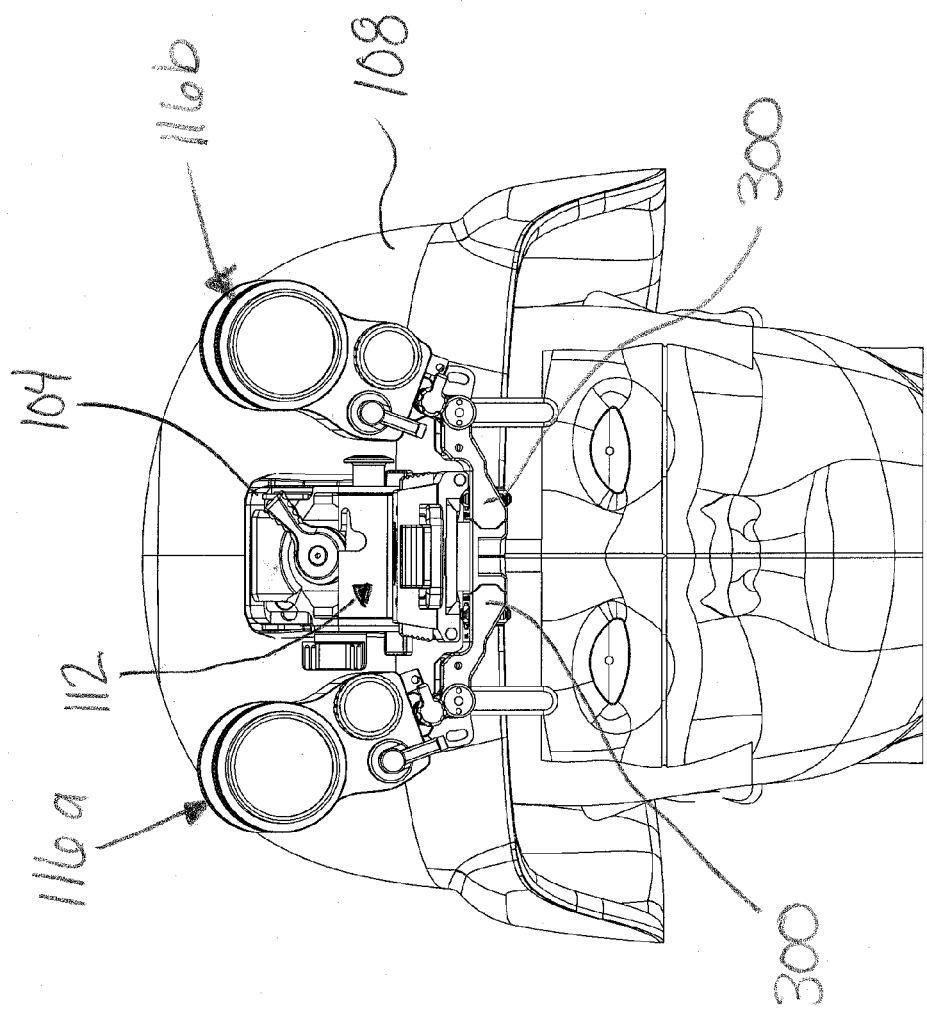
FIG. 10 is a front view of the helmet mount system of FIGS. 1 and 2 in a first stowed position, wherein the optical devices are rotationally pivoted out of the user's line of sight to a first stowed position.
Figure 12:
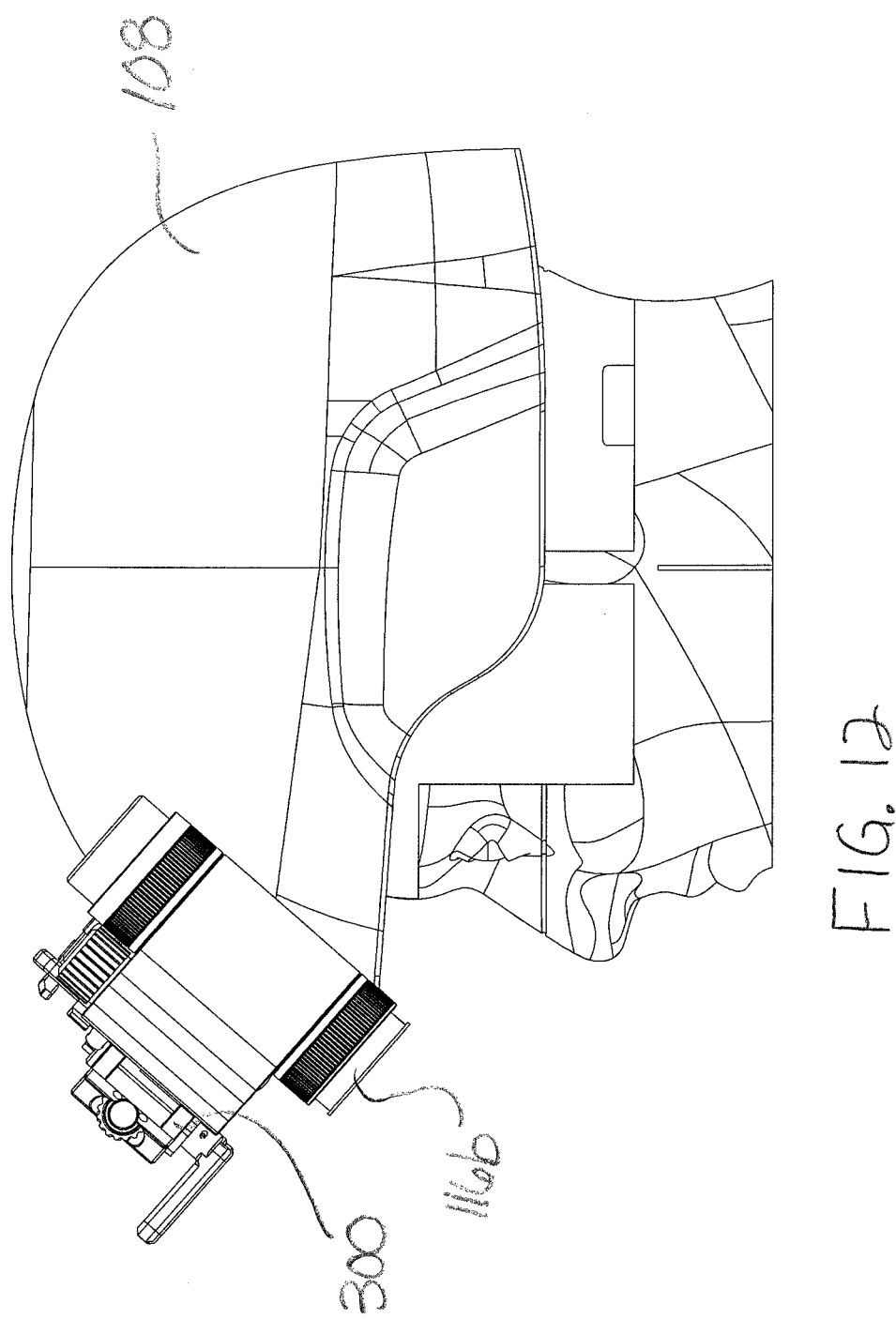
FIG. 12 is a side view of the helmet mount system of FIGS. 1 and 2 in a third stowed position, wherein the optical devices are pivoted about the mount pivot axis and rotationally pivoted to a third stowed position.

As best seen in FIG. 10, the optical devices 116a and 116b are in a first stowed position whereby the optical devices 116a and 116b are rotated with respect to the first pivot arm 300 moving the optical devices 116a and 116b out of the user's line of sight. As best seen in FIG. 11, the optical devices 116a and 116b are in a second stowed position whereby the pivoting helmet mount assembly 112 is pivoted to a fully stowed position. As best seen in FIG. 12, the optical devices 116a and 116b are in a third stowed position whereby the pivoting helmet mount assembly 112 is pivoted to a fully stowed position and the optical devices 116a and 116b are rotated with respect to the first pivot arm 300 placing the optical devices 116a and 116b in close proximity to the user's helmet 108, thus providing a lower profile. Although moving the optical devices 116a and 116b from the viewing position to this third stowed position requires two pivoting actions, it has the advantage of moving the device closer toward the user and over the helmet when the optical device 116a and 116b is not in use, thus reducing neck strain. Thus, the third stowed position as shown in FIG. 12 is advantageous when the optical device is not in use for relatively long periods of time.

Figure 13:
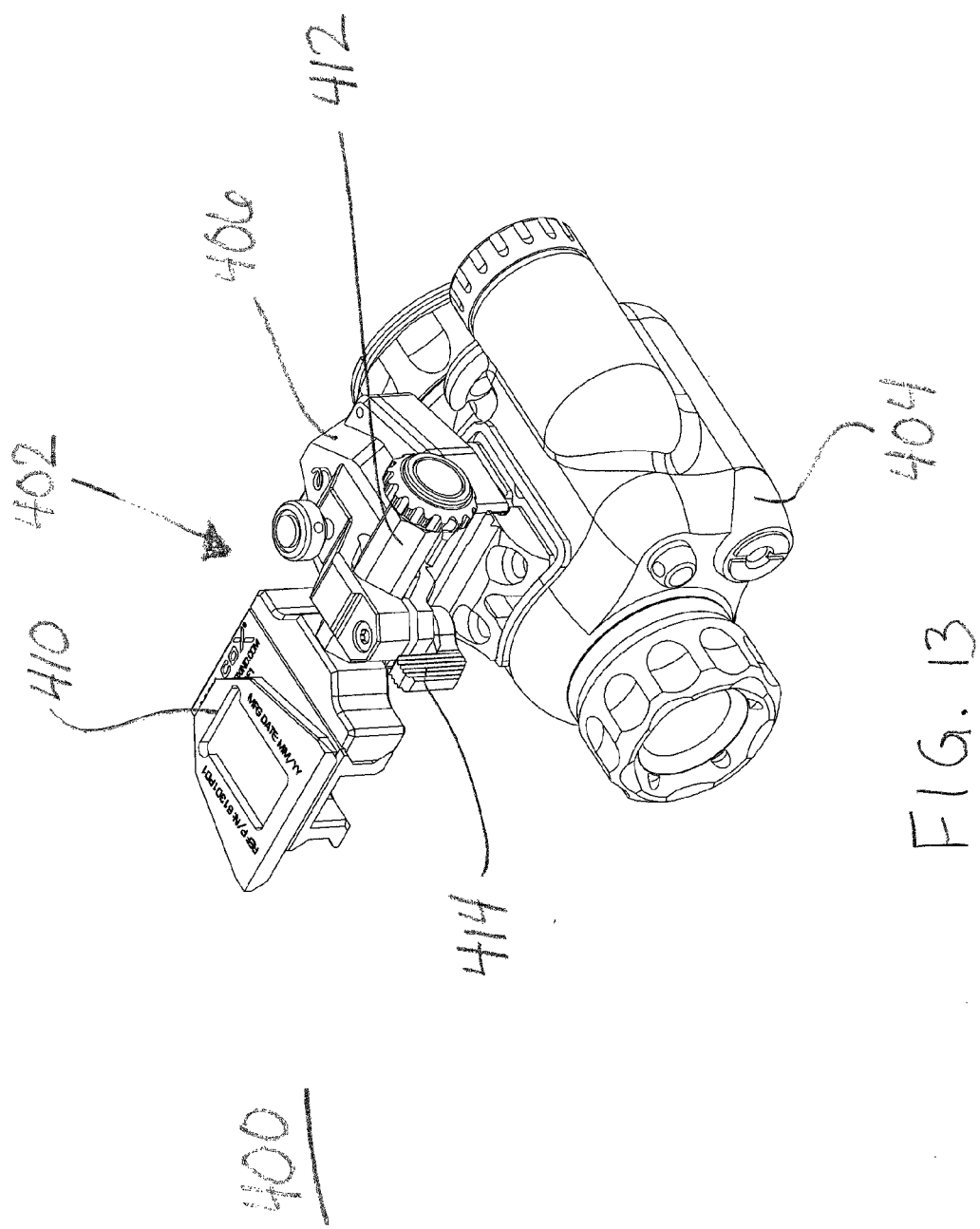
FIG. 13 is an isometric view illustrating an alternative bridge mount embodiment for a left eye monocular device taken generally from the front and side of the optical device.
Figure 14:
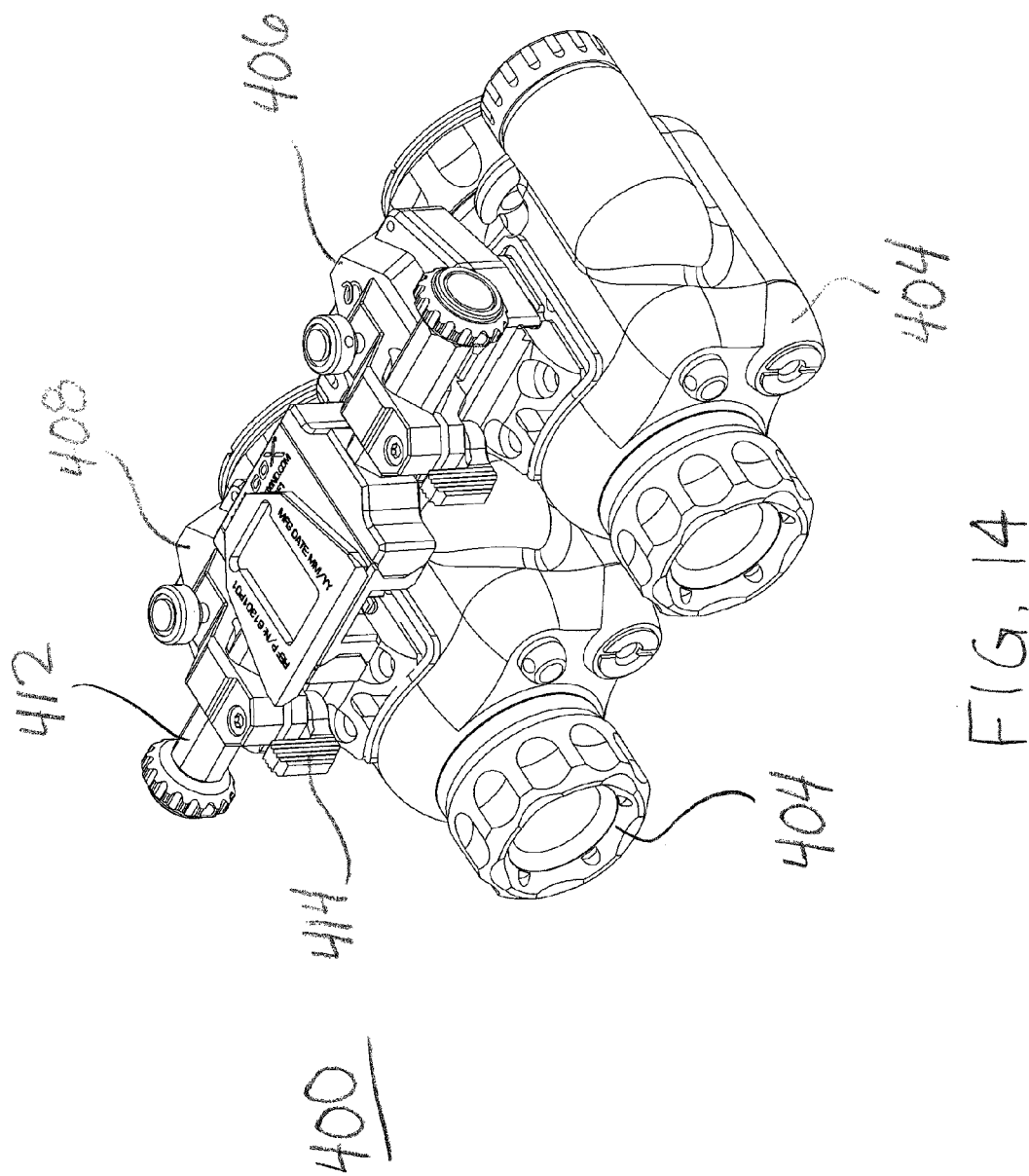
FIG. 14 is an isometric view illustrating the alternative bridge mount appearing in FIG. 13 configured with left and right optical devices to provide binocular vision.

Referring now to FIGS. 13 and 14, an alternative helmet mounting system 400 similar to the embodiment described above with reference to FIGS. 1-12, except the system 400 employs an alternative bridge mount 402 adapted for use with a thermal optical device 404. As best seen in FIG. 13, the bridge mount 402 has one bridge mounting member 406 for mounting one monocular thermal optical device 404. As best seen in FIG. 14, the bridge mount 402 has two bridge mounting members 406 and 408 for mounting two monocular thermal optical devices 404 to create a binocular viewing or imaging system. The bridge mount 402 has a mounting shoe member 410 and may employ one or two bridge mounting members 406. The mounting shoe member 410 may be of the type described above with reference to FIGS. 1-12. The bridge mounting member 406 includes a support member 412 and a button or lever 414. For example, the button or lever 414 may have a cammed or eccentric bearing surface to allow selectively clamping and unclamping the lever 414 relative to the support member 412. The button or lever 414 may be depressed to enable the optical device 404 to slide transversely along the support member 412 to a desired position, enabling the user to adjust the pupillary/interpupillary distance of each optical device 404 to a desired position in front of the user's eyes.

The invention has been described with reference to the preferred embodiments. Modifications and alterations will occur to others upon a reading and understanding of the preceding detailed description. It is intended that the invention be construed as including all such modifications and alterations.

We claim:

1. A bridge mount assembly for mounting an optical device to a helmet, the assembly comprising:
   a mounting shoe member, and
   a bridge mounting member;
   wherein the mounting shoe member comprises a mounting shoe that mates with a mounting shoe receiver attached to the helmet, the bridge mounting member attaches the optical device to the bridge mount assembly, and the bridge mounting member comprises a pivot arm that allows rotation of the optical device around a pivot axis;
   wherein the mounting shoe member is disposed in a central portion of the assembly and is adapted to mate with a bridge mounting member at the left and/or right side of the mounting shoe member.

2. The bridge mount assembly of claim 1, comprising first and second bridge mounting members for attachment of first and second optical devices.

3. The bridge mount assembly of claim 1, wherein the mounting shoe member comprises left and/or right channels that mate with a corresponding protrusion on a bridge mounting member.

4. The bridge mount assembly of claim 3, wherein the channel and protrusion are angled and the bridge mounting member is secured with a threaded knob to prevent wobbling when in use.

5. The bridge mount assembly of claim 1, wherein the mounting shoe is complementary in shape to a receptacle in the mounting shoe receiver.

6. The bridge mount assembly of claim 1, wherein the bridge mounting member comprises a mounting shoe that slides into a complementary shaped mounting shoe receiver on the optical device.

7. A bridge mount assembly for mounting an optical device to a helmet, the assembly comprising:
   a mounting shoe member; and
   a bridge mounting member;
   wherein the mounting shoe member comprises a mounting shoe that mates with a mounting shoe receiver attached to the helmet, the bridge mounting member attaches the optical device to the bridge mount assembly, and the bridge mounting member comprises a pivot arm that allows rotation of the optical device around a pivot axis;
   wherein the bridge mounting member comprises a mounting shoe that slides into a complementary shaped mounting shoe receiver on the optical device; and
   wherein the mounting shoe of the bridge mounting member comprises a pressure foot that is pushed into a base surface in the mounting shoe upon application of pressure to the pressure foot.

8. The bridge assembly of claim 7, wherein pressure is applied to the pressure foot via a camshaft attached to a rotating knob.

9. A bridge mount assembly for mounting an optical device to a helmet, the assembly comprising:
   a mounting shoe member; and
   a bridge mounting member;
   wherein the mounting shoe member comprises a mounting shoe that mates with a mounting shoe receiver attached to the helmet, the bridge mounting member attaches the optical device to the bridge mount assembly, and the bridge mounting member comprises a pivot arm that allows rotation of the optical device around a pivot axis;

wherein the bridge mounting member comprises a mounting shoe that slides into a complementary shaped mounting shoe receiver on the optical device; and wherein the pivot arm is attached to a first pivot sleeve and the mounting shoe is attached to a second pivot sleeve; wherein the first and second pivot sleeves rotate around a central rod that is coaxial with the pivot axis; and wherein the rotation of the first pivot sleeve provides a tilt angle adjustment of the optical device for pupillary and/or interpupillary distance and rotation of the second pivot sleeve provides rotation of the optical device around the pivot axis.

10. The bridge assembly of claim 9, wherein the central rod is attached to an arm that rotates the first pivot sleeve around the central rod.

11. The bridge assembly of claim 10, wherein the arm comprises a magnet that switches off the optical device when the optical device is in a stowed position.

12. A bridge mount assembly for mounting an optical device to a helmet, the assembly comprising:
a mounting shoe member; and
a bridge mounting member;
wherein the mounting shoe member comprises a mounting shoe that mates with a mounting shoe receiver attached to the helmet, the bridge mounting member attaches the optical device to the bridge mount assembly, and the bridge mounting member comprises a pivot arm that allows rotation of the optical device around a pivot axis;
wherein the bridge mounting member comprises a mounting shoe that slides into a complementary shaped mounting shoe receiver on the optical device; and
further comprising a rotational set stop with a first opening and an oblong opening, wherein the central rod passes through the first opening and a threaded fastener passes through the oblong opening to a threaded hole in the first pivot arm, and wherein the threaded fastener can be used to lock the position of the first pivot arm and to set the pupillary and/or interpupillary distance.

13. The bridge assembly of claim 1 adapted for mounting to one or more optical devices selected from the group consisting of monoculars, binoculars, sighting devices, targeting devices, night vision devices, enhanced night vision goggles, thermal imaging devices, infrared imaging devices, short-wave infrared imaging devices, and helmet mounted display screens.

14. An optical bridge-helmet mount assembly comprising:
a bridge mount assembly for mounting an optical device to a helmet, the assembly comprising a mounting shoe member and a bridge mounting member, wherein the mounting shoe member comprises a mounting shoe that mates with a mounting shoe receiver attached to the helmet, the bridge mounting member attaches the optical device to the bridge mount assembly, and the bridge mounting member comprises a pivot arm that allows rotation of the optical device around a pivot axis; and
a helmet mount assembly that connects the bridge mount assembly to the helmet;
wherein the helmet mount assembly comprises a pivot pin assembly that allows the bridge mount assembly to be pivoted between a lower position and an upper position for use and stowage, respectively, of an optical device attached to the bridge mount assembly.

15. The optical bridge-helmet mount assembly of claim 14, wherein the helmet mount assembly comprises a vertical adjustment mechanism.

16. The optical bridge-helmet mount assembly of claim 14, wherein the helmet mount assembly comprises a tilt adjustment mechanism.

17. The optical bridge-helmet mount assembly of claim 14, further comprising:
an optical device.

18. The system of claim 17, wherein the optical device is selected from the group consisting of monoculars, binoculars, sighting devices, targeting devices, night vision devices, enhanced night vision goggles, thermal imaging devices, infrared imaging devices, short-wave infrared imaging devices, and helmet mounted display screens.

* * * * *